N. J. PARKER.
MULTISTAGE COMPRESSOR.
APPLICATION FILED APR. 28, 1916.

1,224,661.

Patented May 1, 1917.
9 SHEETS—SHEET 1.

WITNESSES

INVENTOR
N. J. Parker
BY
ATTORNEYS

N. J. PARKER.
MULTISTAGE COMPRESSOR.
APPLICATION FILED APR. 28, 1916.

1,224,661.

Patented May 1, 1917.
9 SHEETS—SHEET 3.

WITNESSES
H. T. Walker
B. Jeffs

INVENTOR
N. J. Parker
BY Mundle
ATTORNEYS

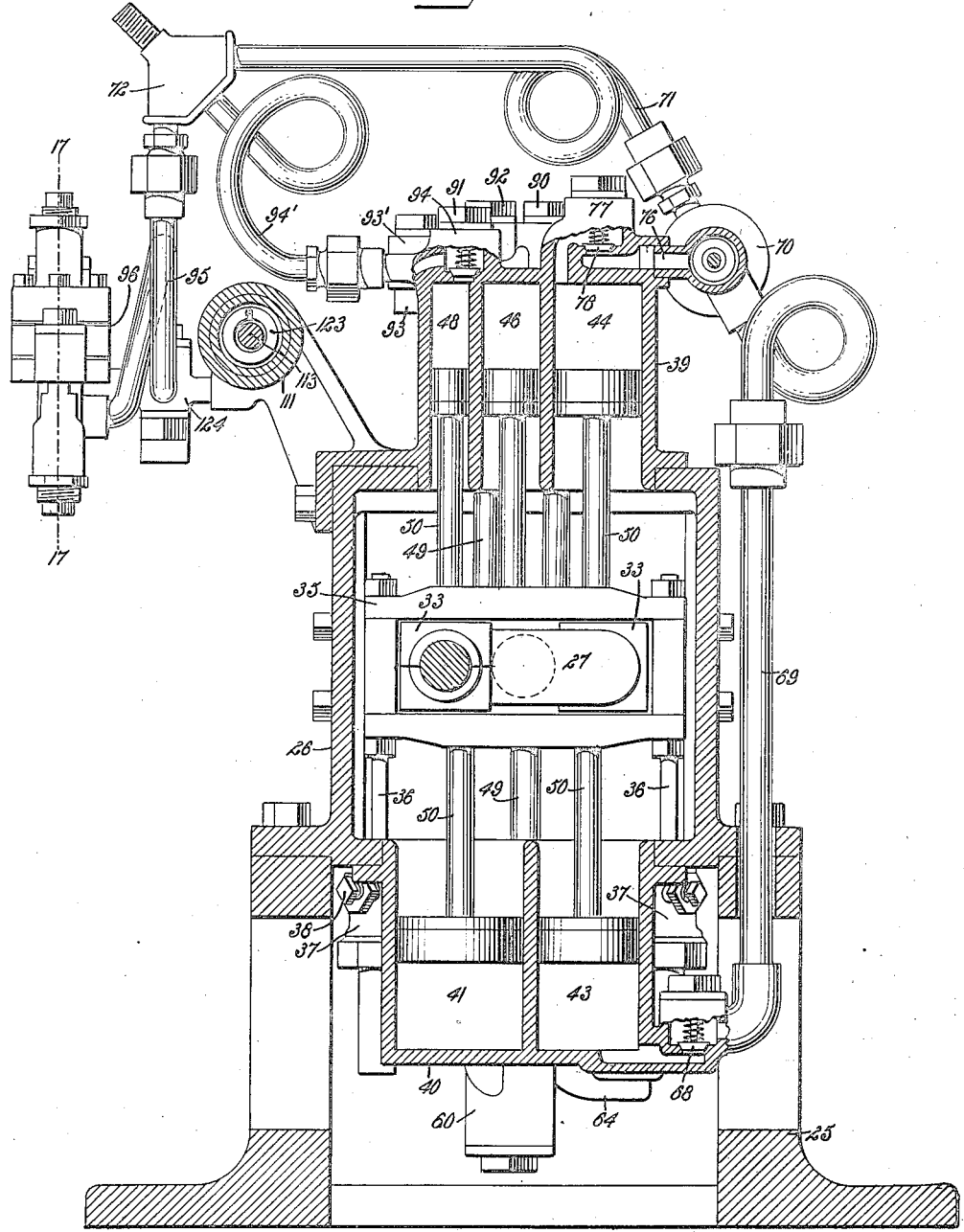

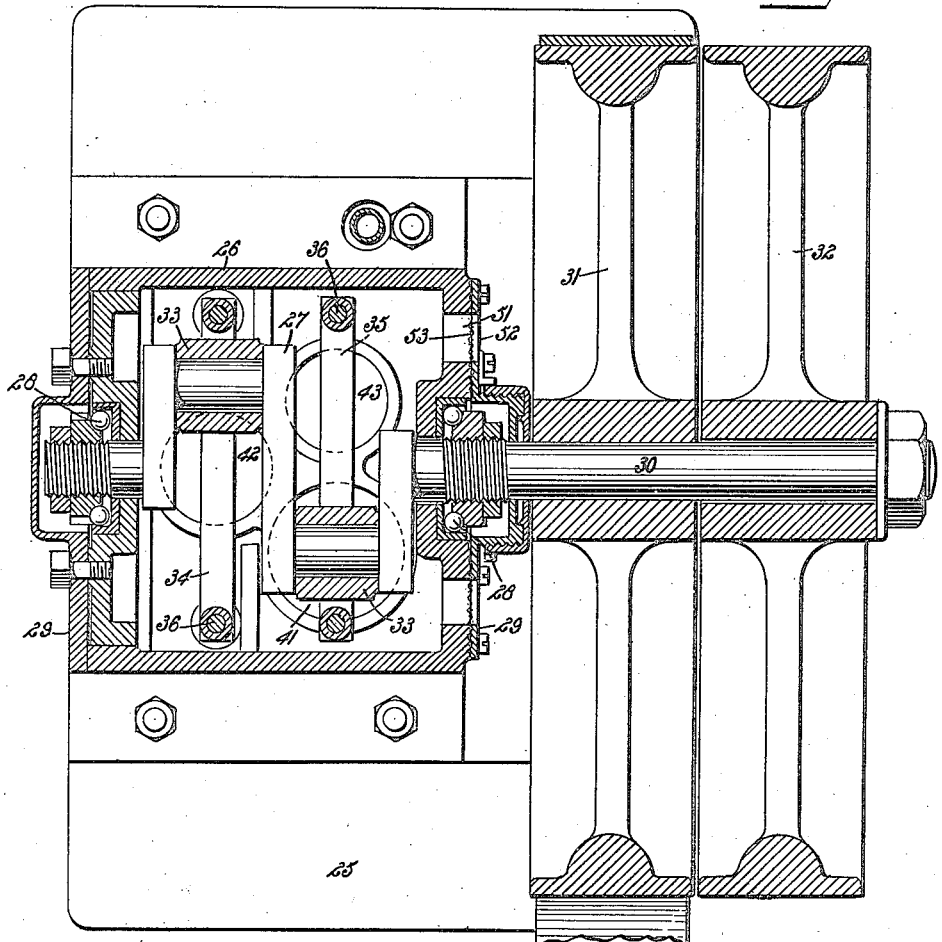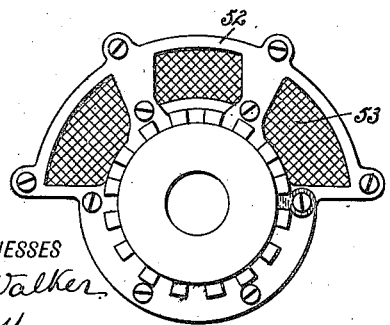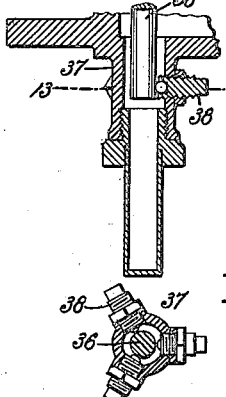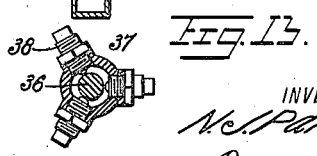

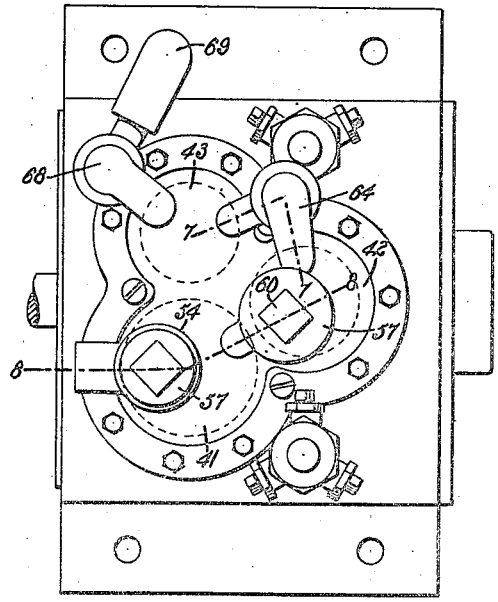
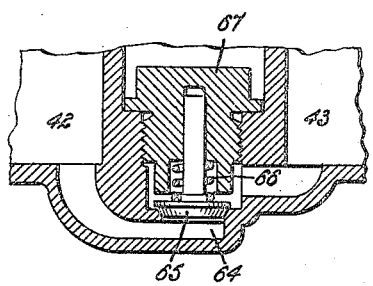
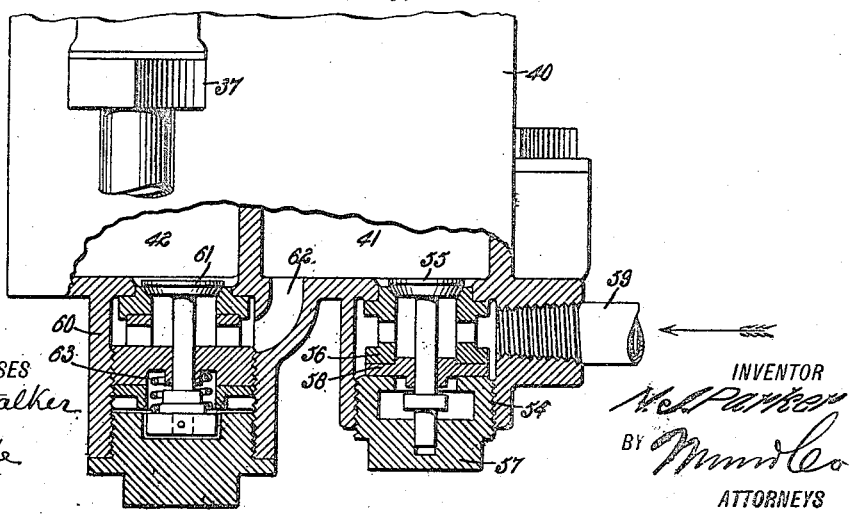

N. J. PARKER.
MULTISTAGE COMPRESSOR.
APPLICATION FILED APR. 28, 1916.
1,224,661.
Patented May 1, 1917.
9 SHEETS—SHEET 7.
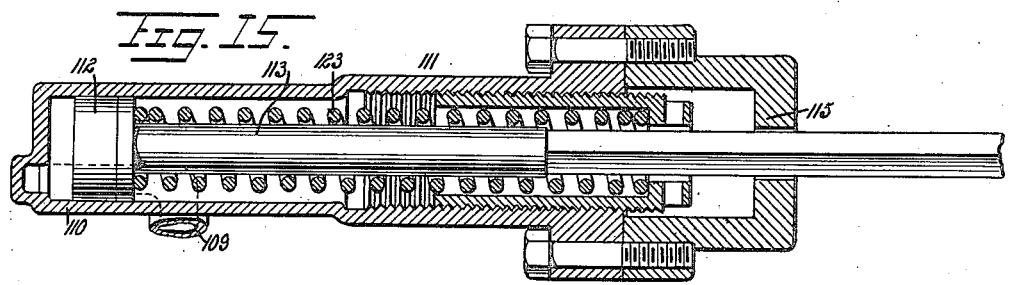
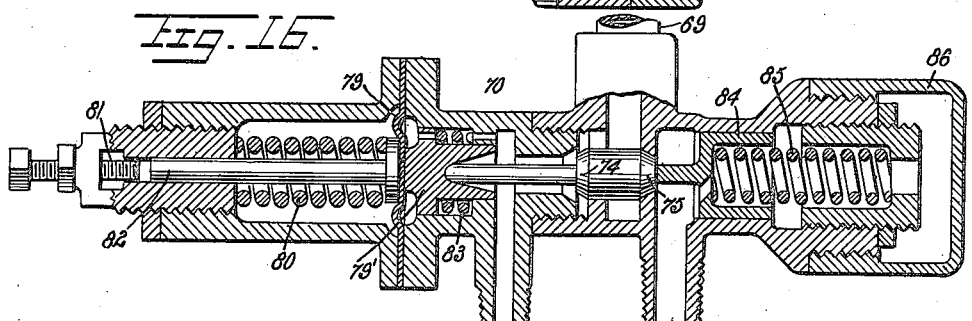
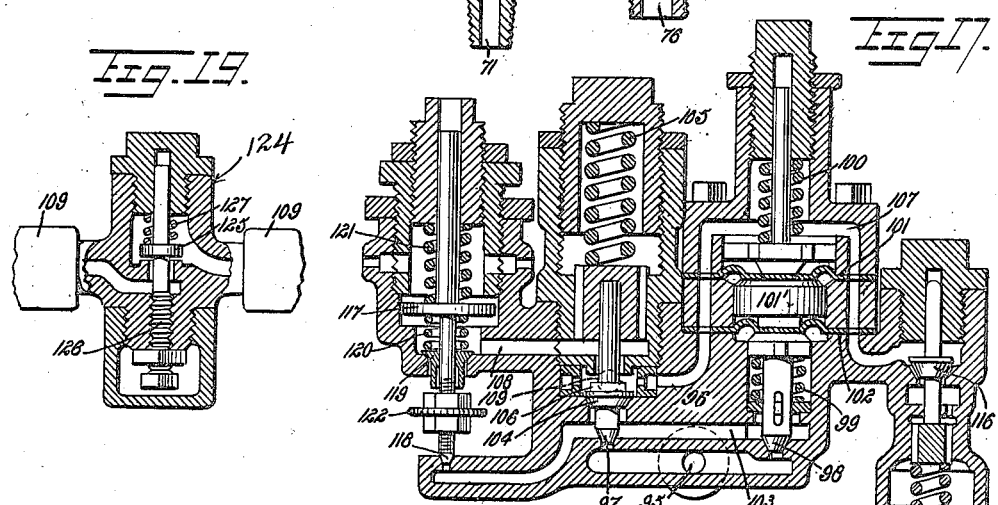
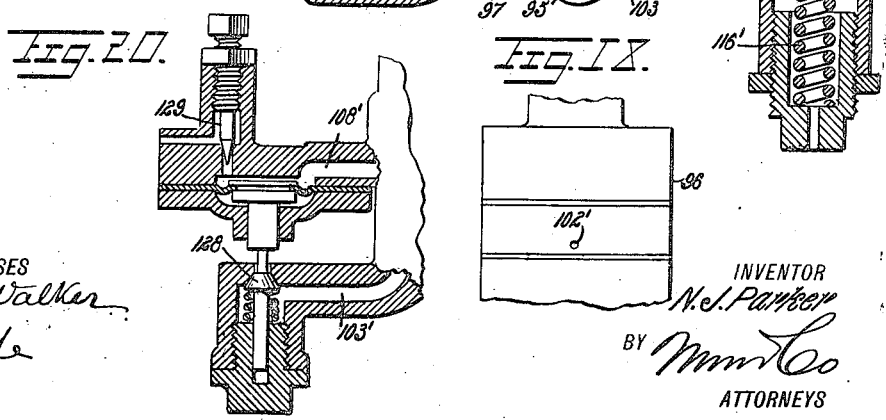
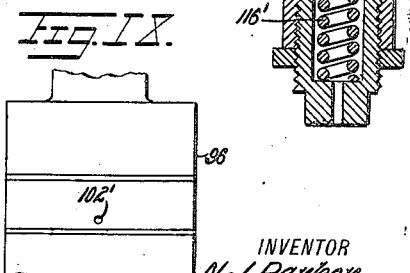
WITNESSES
H. T. Walker
B. Joffe
INVENTOR
N. J. Parker
BY
ATTORNEYS

N. J. PARKER.
MULTISTAGE COMPRESSOR.
APPLICATION FILED APR. 28, 1916.

1,224,661.

Patented May 1, 1917.
9 SHEETS—SHEET 8.

WITNESSES
H. J. Walker
B. Joffe

INVENTOR
N. J. Parker
BY Munn & Co.
ATTORNEYS

N. J. PARKER.
MULTISTAGE COMPRESSOR.
APPLICATION FILED APR. 28, 1916.
1,224,661.
Patented May 1, 1917.
9 SHEETS—SHEET 9.
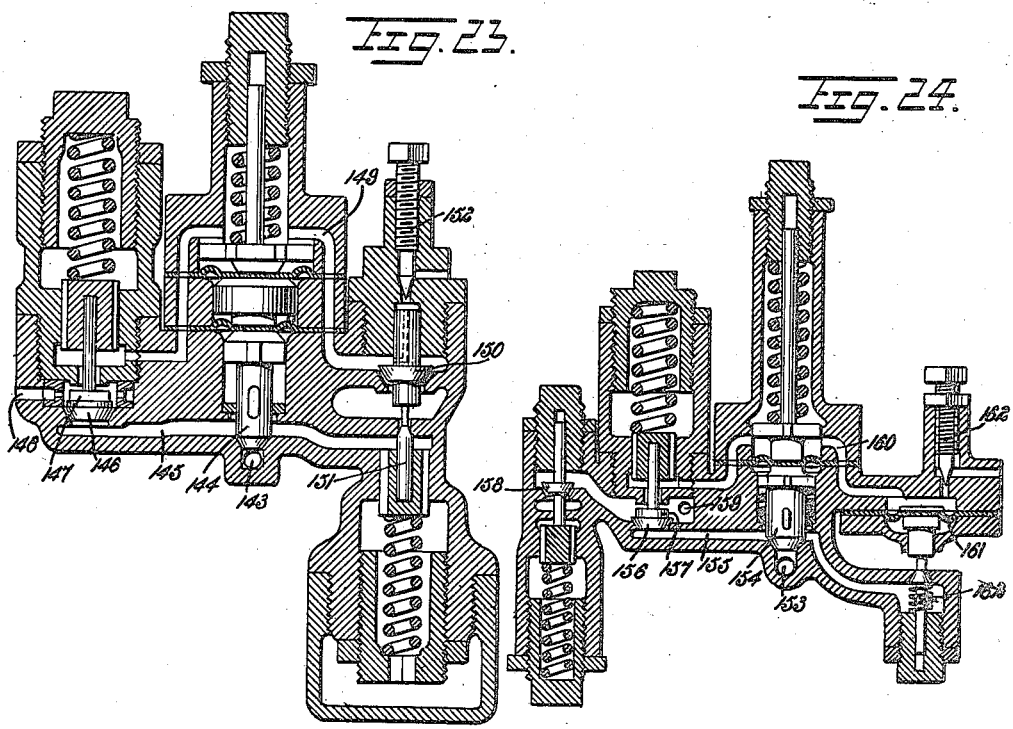
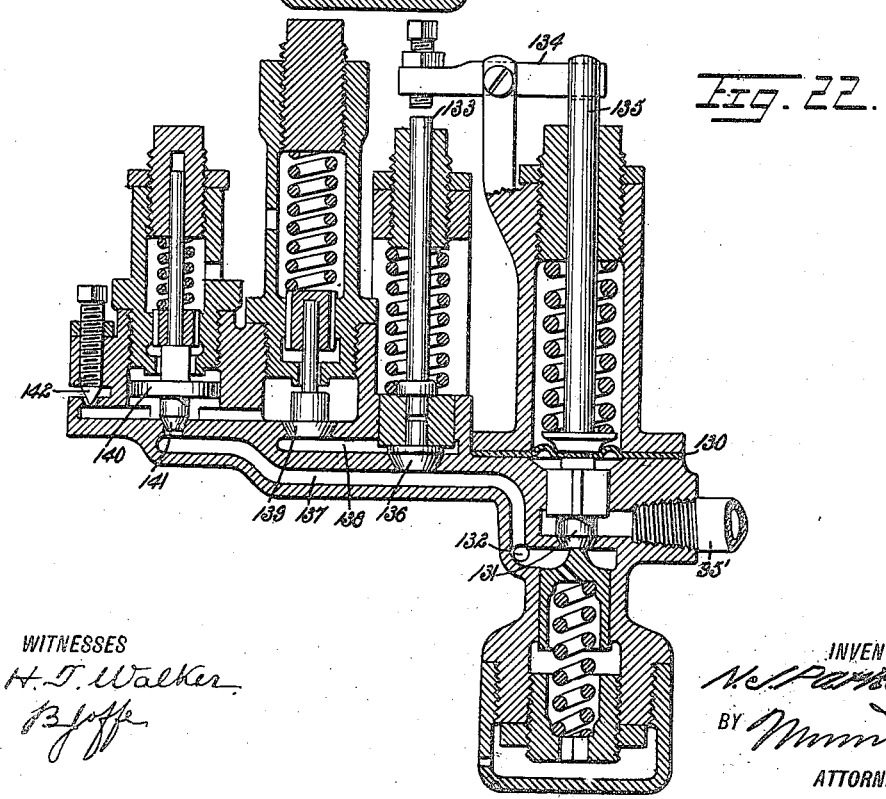
WITNESSES
H. T. Walker
B. Joffe
INVENTOR
N. J. Parker
BY
ATTORNEYS

UNITED STATES PATENT OFFICE.

NELSON J. PARKER, OF LINCOLN, ILLINOIS.

MULTISTAGE COMPRESSOR.

1,224,661.  Specification of Letters Patent.  Patented May 1, 1917.

Application filed April 28, 1916. Serial No. 94,144.

*To all whom it may concern:*

Be it known that I, NELSON J. PARKER, a citizen of the United States, and a resident of Lincoln, in the county of Logan and State of Illinois, have invented a new and Improved Multistage Compressor, of which the following is a full, clear, and exact description.

My invention relates to a multistage compressor, and an object thereof is to provide a compact and efficient air compressor having two series of multiples united by a pressure governor. Another object of the invention is to provide a compressor of the class described in which the motive power driving the compressor is controlled through the medium of the predetermined maximum pressure generated by the compressor. A still further object of the invention is to provide a pneumatically-operated mechanism which will operate rapidly when coupling or uncoupling the compressor from the motive power.

With the above and other objects in view, the nature of which will more fully appear as the description proceeds, the invention consists in the novel construction, combination and arrangement of parts as herein fully described, illustrated and claimed. In the accompanying drawings, forming part of the application, similar characters of reference indicate corresponding parts in all the views.

Fig. 3 is a top plan view on line 3—3, Figs. 1 and 2;

Fig. 4 is a vertical section on line 4—4, Fig. 2;

Fig. 5 is a horizontal section on line 5—5, Fig. 2;

Fig. 6 is a bottom-side-up view of the compressor, the compressor base being removed;

Fig. 7 is a fragmentary section on line 7—7, Fig. 6;

Fig. 8 is a section on line 8—8, Fig. 6;

Fig. 9 is a section on line 9—9, Fig. 3;

Fig. 10 is a section on line 10—10, Fig. 9;

Fig. 11 is a section on line 11—11, Fig. 3;

Fig. 12 is a section on line 12—12, Fig. 1;

Figure 1:
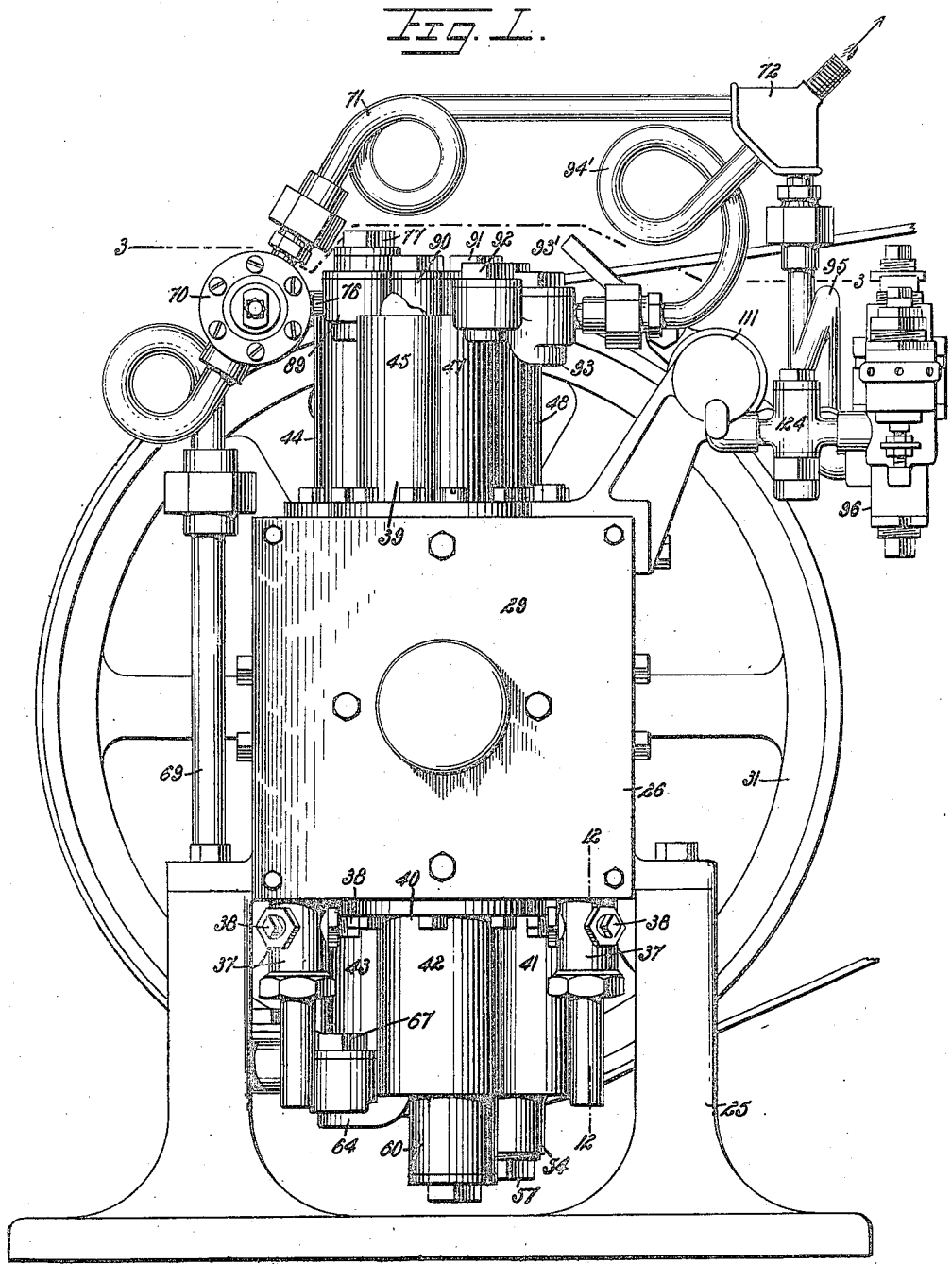
Figure 1 is an end elevation of my compressor.
Figure 2:
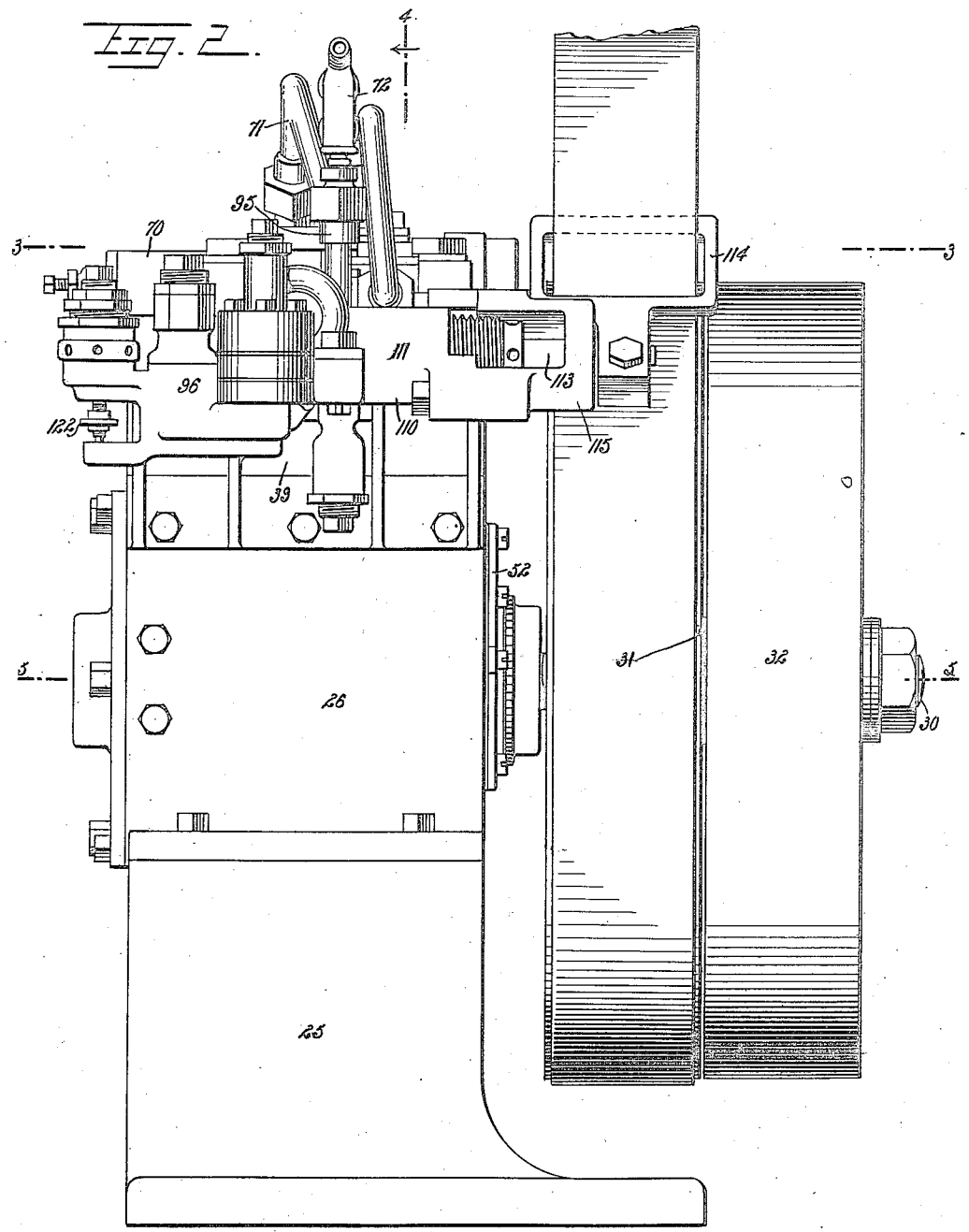
Fig. 2 is a front elevation.
Figure 21:
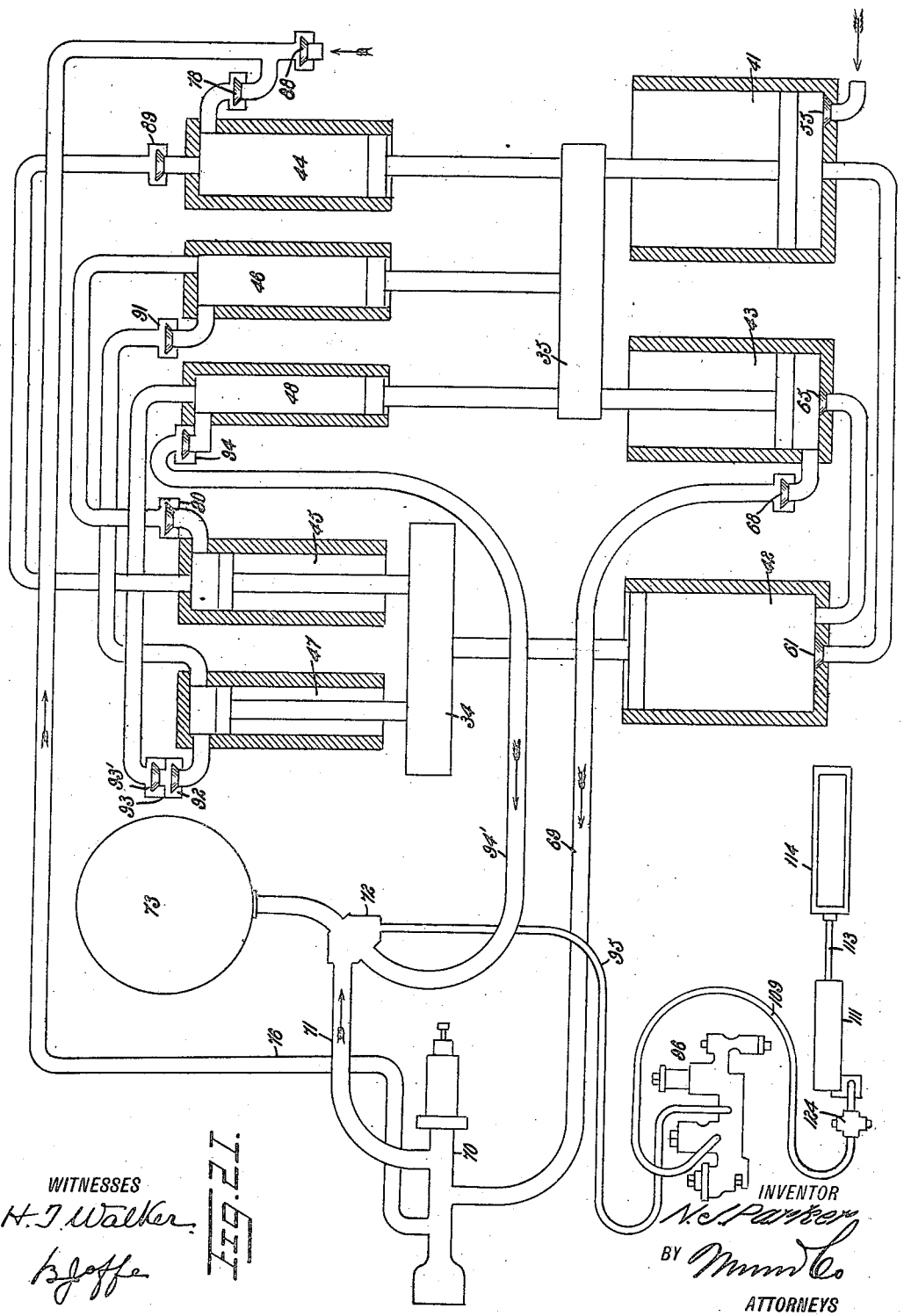

Fig. 13 a section on line 13—13, Fig. 12;

Fig. 14 is a front elevation of the shutter on the crank case;

Fig. 15 is a longitudinal section through the belt shifter;

Fig. 16 is a longitudinal section through the pressure governor;

Figure 17 is a vertical section through the multiple valve mechanism, taken on line 17—17, Fig. 4, for controlling the operation of the valve shifter;

Fig. 18 is a fragmentary exterior view of the multiple valve;

Fig. 19 is a section through the check valve interposed between the multiple valve and the belt shifter;

Fig. 20 is a modified structure of the relief valve in the multiple valve;

Fig. 21 is a diagram showing the connection and position of the various parts of the compressor; and Figs. 22, 23, and 24 are modified forms of the multiple valve shown in Fig. 17.

Referring to the drawings, 25 is the base to which a crank case 26 is secured. A double crank shaft 27 is mounted to revolve within the crank case on suitable ball bearings 28 provided in the end walls of the crank case and inclosed by caps forming part of end walls 29 to make said bearings dustproof. One end 30 of the crank shaft projects through a cap of an end plate 29 to receive a pulley 31, constrained to rotate with the shaft, and a pulley 32 free to revolve on the shaft. The two cranks of the shaft are at an angle of 180 degrees, each crank bearing in a block 33. One of the blocks 33 engages a slotted crosshead 34, and the other engages a similar crosshead 35. Each of the crossheads has a pair of guide rods 36 each forming an extension of the crosshead assembling bolt. Each extension engages a socket 37 (see Fig. 12) forming an extension of the crank case and wherein adjusting studs 38 are provided to bear against the rod with a ball carried by the stud. In addition the crossheads may be guided by the side walls of the crank case.

Secured to the top and bottom of the crank case are blocking castings 39 and 40 respectively, each having a plurality of cylinders. The cylinders 41 and 43 of the block casting 40, and the cylinders 44, 46, and 48 of the block casting 39, are in alinement with the crosshead 35. The cylinder 42 of the block casting 40, and the cylinders 45 and 47 of the block casting 39 aline with the crosshead 34. The pistons of the cylinders 42, 45, and 47 are secured to the crosshead 34 by rods 49. The pistons of the cylinders 41, 43, 44, 46, and 48 are secured by rods 50 to the crosshead 35. The cylinders being open within the crank case, provision is made for the displacement of air, due to the displacement of the pistons within the cylinders, by forming apertures 51 in one of the end walls of the crank case. To regulate the flow of air through said apertures, and protect the case from dust, an adjustable plate 52 is provided which has screened apertures 53 (see Fig. 14) adapted to register with the apertures 51 of the end wall.

The block casting 40 (see Fig. 8) has a valve housing 54 accommodating a valve 55 which seats against a cage 56 locked within the housing by a nut 57, a guide 58 for the stem of the valve 55 being interposed between the cage and the nut. The valve 55 checks the flow from the cylinder 41 into the valve housing 54 which is in communication with the atmosphere through a suitable conduit 59. A similar valve housing 60 in the block casting 40 is provided for the cylinder 42. A valve 61 in said housing checks the outflow from the cylinder to the housing 60 which is in communication with the cylinder 41 by suitable passages 62. The valve 61 is maintained against its cage by a spring 63 located between the guide and the end of the stem in the housing. The said spring 63 prevents the valve 61 from moving from its seat unless a certain pressure is exerted upon said valve. The cylinders 42 and 43 of the block casting 40 are in communication through a valve-controlled passage 64 (see Fig. 7). The valve 65 in this passage is retained on its seat by a spring 66 carried within a plug 67 seated in the block casting 40 and constituting a guide for the stem of the valve. The cylinder 43 discharges through a check valve 68 (see Fig. 4) into a receiver 69 leading to a pressure control 70.

The pressure control 70 is also connected by a conduit 71 to a union 72 in communication with a reservoir 73 for storing the compressed air. A valve 74 (see Fig. 16) within the pressure governor controls the communication between the conduits 69 and 71. A valve 75 rigid with valve 74 controls the communication of the conduit 69 with a passage 76 of the pressure control, which passage is in communication with the cylinder 44 through a valve housing 77 provided for said cylinder on the block casting 39, a check valve 78 therein checking the flow from the cylinder into the pressure governor. It will be noted that when the valve 75 closes the communication between the passage 76 and the conduit 69, the valve 74 is unseated, and thereby communication is established between the conduits 69 and 71. When communication between the passage 76 and conduit 69 is established by the valve 75, the valve 74 severs the communication between the conduits 69 and 71.

The stem of the valve 74 engages a guide block 79' contacting with a diaphragm 79. The diaphragm 79 is under the action of a spring 80. The displacement of the diaphragm against the action of the spring is limited by a set screw 81 which lies in the path of a rod 82 mounted to participate in the movement of the diaphragm 79. A coil spring 83 is provided for maintaining the guide block 79' in contact with the diaphragm. A guide block 84 is maintained against the valve 75 by a spring 85. The tension of the springs 80 and 85 may be varied by the threaded members engaging said springs. It will be noted that the guide block 84 is apertured so that the air pressure on said block is balanced. A cap 86 is provided at the end of the pressure controller to prevent the air passing through the passage 76 from escaping into the atmosphere.

The valve housing 77 of the block casting 39 has an extension 87 accommodating a valve 88 which checks the flow from the passage 76 to the atmosphere, and whereby the cylinder 44 can receive air directly from the atmosphere when the valve 75 of the pressure control is seated. The cylinder 44 discharges into the cylinder 45 through a valve housing 89, the valve structure of which is similar to the valve 65 (see Fig. 7). The cylinder 45 discharges into the cylinder 46 through a valve housing 90; the cylinder 46, into the cylinder 47 through a valve housing 91; cylinder 47, into cylinder 48 through a valve housing 92, a receiver 93 and valve housing 93' and cylinder 48 through a valve housing 94 into a conduit 94' leading to union 72. The structures of the valve housings 89, 90, 91, 92, 93' and 94 are similar to that shown in Fig. 7.

The union 72 is also connected by a conduit 95 to a multiple-valve control 96 (see Fig. 17) and subjects the two valves 97 and 98 to the pressure of the storage reservoir 73. The valve 98 opens at a predetermined pressure, depending on the springs 99 and 100 and the diaphragms 101 and 102. The two diaphragms are spaced by a guiding block 101', and the space therebetween is in communication with the atmosphere through a vent 102'. The air entering into a passage 103 acts on a valve 104 in rigid connection with the valve 97, whereby the total pressure upon the stem of the valve 97 is increased and the same is raised against the pressure of a spring 105. The displacement of the valve 104 brings a valve 106, forming part of valve 104, against its seat and cuts off a passage 107 from a passage 108. The air entering said passage 107 forces the valve 98 on its seat, also a valve 116 on its seat, against the resistance of a spring 116', thus cutting off the passage 107 from the atmosphere.

The air pressure which has displaced the valve 104 escapes through a passage 109 (shown in dotted lines in Fig. 17), which leads to a cylinder 110 of a belt shifter 111 (see Fig. 15). A flow regulator 124 (see Fig. 19) intercepts the passage 109, whereby th rate of flow from the multiple-valve mechanism to the belt shifter is regulated by varying the clearance between the valve 125 and the seat thereof, from which it is maintained clear by the screw 126. It will be noted that the flow from the belt shifter to the multiple-valve mechanism is free, it being resisted only by a spring 127 which maintains the valve against the screw. The air entering the cylinder 110 displaces a piston 112, the rod 113 of which is connected to a yoke 114 which engages the belt from the pulley 31 to the loose pulley 32. The movement of the piston is limited by the engagement of a shoulder on the rod with a bracket 115 provided on the extension of the cylinder 110.

As the pressure falls in the reservoir 73 below a predetermined point, the valve 104 returns to its seat, allowing the air to enter the passage 108 where it acts on a valve 117 which is rigid with a valve 118. A valve 119 is movable on the stem of the valves 117 and 118 and is normally retained on its seat by a spring 120. The valve 118 is normally retained on its seat, and the valve 117, off its seat, by a spring 121. The stem of the valves 117 and 118 below the valve 119 is provided with an adjustable contrivance 122 which is adapted to engage the collar of the valve 119 after the valve 118 has been raised a predetermined distance. The seating of the valve 117 allows the air in the passage 103 to escape into the atmosphere, and valve 104 is seated. When valve 117 is seated, valve 119 is off its seat and the air is allowed to exhaust from the passage 108; that is, the air from passage 107 exhausts subsequently to the exhaustion of the air from under the diaphragm 102, which communicates with the passage 103. The reduction of pressure in the passage 107 allows a spring 116' to raise the valve 116, whereby all the valves of the multiple-valve mechanism are in their working position.

As the passage 108 is also in communication with the passage 109, the displacement of the valve 119 from its seat allows a rapid exhaust of air from the cylinder 110 of the belt shifter. This exhaust is further accelerated by the action of a spring 123 upon the piston and whereby the shifting of the belt is rapid. The tension of the spring in the shifter, as well as in the multiple valve mechanism, is adjustable by the nuts co-operating with the corresponding springs. The inside diameter of the cage where the valve 104 is provided is such that air pressure is prevented from flowing past the valve 104 as fast as the opening controlled by the valve 97 can supply.

Considering the block casting 40 with the pistons of the cylinders 41 and 43 on their outstroke, cylinder 41 is taking free air; and the piston of the cylinder 42 being on its instroke is compressing through valve 65 into the cylinder 43. Assuming one pound gage pressure in storage reservoir 73, the piston of cylinder 42 compresses into cylinder 43 until the pressure in said cylinder is sufficient to open valve 68, when the piston of cylinder 42 compresses into both, cylinder 43, and through valve 68 into the storage reservoir. In the following half revolution the piston of cylinder 41 compresses into cylinder 42, and piston 43 compresses into the storage reservoir.

When the pressure in the cylinder 42 is great enough to raise the valve 65 from its seat against the storage reservoir pressure, the piston of cylinder 41 will compress through valve 65 into cylinder 43 and into the storage reservoir. This is true when the reservoir is at low pressure. A single cylinder compressor would early in its compression stroke reach a pressure sufficient to open the outlet valve against one pound gage pressure in the storage reservoir; and its piston would carry gage pressure in storage reservoir throughout the greater part of its compression stroke. In multiple cylinder compressors, the first cylinder discharges into the following one before it opens a valve leading to the storage reservoir, and, conseqeuntly, it carries the storage reservoir pressure during the minor part of its stroke. The cylinder 43 which carries storage reservoir pressure during the greatest part of its stroke is of much less area than a cylinder 41 of a single compressor.

When the pressure in the storage reservoir is sufficient to hold the valve 68 against the discharge from the cylinder 42 into the cylinder 43, the cylinder 43 reaches at the end of its out stroke the maximum initial gage pressure, which gage pressure is the maximum final gage pressure of the cylinder 42. This result is due to the ratio of the successive cylinders; consequently the multistage compressor will open but one valve against reservoir pressure with its smallest piston on its instroke. The pressure control 70 is so adjusted that at fifty pounds pressure in the storage reservoir the valve 75 is seated. Therefore the cylinder 44 of the casting 39 will receive its air from the atmosphere through the valve 88; consequently, the cylinders of the block casting 39 will force their air into the storage reservoir independently of the cylinders in the block casting 40; that is to say, the lower and upper series of cylinders constitutes independent compressors. The action of the cylinder in the upper compressor is similar to what has been described for the cylinders in the lower compressor. When the pressure in the storage tank is higher than 50 pounds the valve 74 seats and cuts off the lower compressor from the conduit 71 and brings it into communication with the passage 76. Thus, the cylinder 44 of the upper compressor receives the air from the cylinder 43, and, consequently, the upper and lower compressor constitute a single multiple compressor of eight cylinders discharging into the storage reservoir through the conduit 94'.

In Fig. 20 is shown a modification of the relief valve in the multiple-valve structure. It will be noted that the air pressure in passage 108' acts on the diaphragm, which unseats a valve 128 to discharge air from the passage 103' into the atmosphere. A needle valve 129 controls the escape of air from the passage 108' into the atmosphere.

In Fig. 22 a modified structure of the multiple valve mechanism is shown. The air from the conduit 95' acts on a diaphragm 130; and when a valve 131 is displaced air is allowed to pass through a passage 132 to the belt shifter. The displacement of the valve 131 brings pressure upon the stem 133 through the medium of a lever 134 connected to the stem 135 of a valve engaging the diaphragm. Thus, a valve 136 is retained on its seat by the added pressure to overbalance the air pressure against the valve 136 in the passage 137. When there is a reduction in pressure in said passage 137 the valve 131 seats, and pressure on the valve 136 is reduced; consequently, the same will leave its seat, allowing the air to pass into a passage 138. The air in the passage 138 displaces a valve 139 and acts on a valve 140 which is integral with a valve 141, whereby said valve 141 is raised from its seat and air is allowed to escape from the passage 137 into the atmosphere by a needle valve 142. In consequence the valves 136 and 139 return to their seats; and when the pressure in the passage 137 is reduced, the valve 141 returns to its seat, and the device is again in its normal position.

In Fig. 23 a further modification of the multiple valve mechanism is shown. The pressure from the reservoir acts through a passage 143 on a valve 144; and when the valve is raised from its seat against the resistance of the diaphragms and spring, the air enters into the passage 145, raising a valve 146 from its seat and seating a valve 147 integral therewith on its seat. Thus, the air from passage 143 flows into a passage 148 leading to the belt shifter. When the pressure falls in the passage 145, the valve 146 takes its seat, the air from the passage 148 flows into a passage 149, whereby the valve 144 is seated, also valve 150. The seating of valve 150 displaces valve 151 from its seat, allowing the air to exhaust from the passage 145. Air from the passage 149 exhausts through the hollow stem of the valve 150 and through the passage controlled by needle valve 152.

In Fig. 24 a further modification of the multiple-valve mechanism is shown. The passage 153 from the storage reservoir supplies pressure to valve 154. When unseated it admits air pressure into the passage 155, whereby the valve 156 is raised from its seat and the valve 157, integral with valve 156, is moved against its seat. The air from passage 153 seats the valve 158 and flows through passage 159 to the belt shifter. When the pressure in the passage 153 falls, the valve 156 returns to its seat, allowing air from the belt shifter to flow through a passage 160 to the diaphragm to return the valve 154 to its seat, and also to act on a diaphragm 161 as it passes to the atmosphere through a needle valve 162. The displacement of the diaphragm unseats a valve 163 and allows the air in passage 155 to escape. The reduction of pressure in passage 160 allows the spring to raise the valve 158 from its seat and exhaust the air from said passage into the atmosphere through said valve.

While I have described the principle of operation, together with the compressor which I now consider to be the best embodiment thereof, I desire to have it understood that the compressor shown is merely illustrative and that such changes may be made as are within the scope of the appended claims.

I claim:

1. In combination, a pair of independent multistage-compressor units, the smallest cylinder of one of said multistage-compressor units being larger than the largest cylinder of the second multistage-compressor unit, a reservoir associated with the outlets of said compressor units, and a pressure-governed valve associated with the outlet of the first compressor unit and with the inlet of the second compressor unit, said pressure-governed valve including means operable by a predetermined pressure for severing communication between the outlet of the first compressor unit with the reservoir and establishing communication between the outlet and the inlet of the second compressor unit to transform the two units into a single compressor unit.

2. In combination, a pair of multistage-compressor units, the smallest cylinder of one of said units being larger than the largest cylinder of the second of said compressor units, a reservoir associated with the outlets of said compressor units, and a valve connecting the outlet of the first compressor unit with the inlet of the second compressor unit, said valve becoming operable at a predetermined pressure to sever the first compressor unit from the reservoir and cause it to discharge into the second, whereby the two units are transformed into a single multistage compressor unit.

3. In combination, a pair of multistage-compressor units, the smallest cylinder of one of said units being larger than the largest cylinder of the second unit, a reservoir associated with the outlets of said units, a pressure-governed valve interposed between the outlet of the first compressor unit, the reservoir and the inlet of the second unit to cause said first compressor unit to discharge into said second unit when the pressure in said reservoir has reached a predetermined point.

4. In combination, a pair of multistage-compressor units, the smallest cylinder of one of said units being larger than the largest cylinder of the second of said units, a reservoir associated with the outlets of said units, a valve casing interposed between the outlets of the first compressor units, the reservoir and the inlet of the second unit, a valve in said casing for simultaneously cutting off the communication between the outlet of the first compressor unit with the reservoir and establishing communication between said first compressor unit with the inlet of the second compressor unit, and vice versa, and pressure-applying means acting on the valve to maintain the same in a position such that normally the outlet of the first compressor unit is in communication with the reservoir, said pressure-applying means adapted to yield when a predetermined pressure is reached in the reservoir, whereby communication is severed between the outlet of the first unit with the reservoir and established between said outlet of the first unit and the inlet of the second unit.

5. In combination, a pair of multistage-compressor units, the smallest cylinder of one of said units being larger than the largest cylinder of the second of said units, a reservoir associated with the outlets of said units, a valve casing interposed between the outlet of the first compressor unit, the reservoir and the inlet of the second unit, a valve in said housing adapted to bring into communication the outlet of the first compressor unit with either the reservoir or the inlet of the second unit, a diaphragm exposed to the air pressure of the reservoir, a spring acting on the diaphragm to resist the movement thereof under the action of the air in the reservoir and whereby the valve normally tends to establish communication between the reservoir and the outlet of the first compressor unit, and resilient means coöperating with the valve for counteracting the spring acting on the diaphragm and helping the displacement of said valve when a predetermined pressure has been obtained in the reservoir, whereby the communication between the first compressor unit with the reservoir is severed and that of said first unit with the inlet of the second unit is established.

6. In combination, a pair of multistage-compressor units, a reservoir associated with the outlets of said units, a valve housing interposed between the outlet of the first unit, the reservoir, and the inlet of the second unit, a valve in said housing for establishing communication between the outlet of the first unit with either the reservoir or the inlet of the second unit, a diaphragm in said housing subjected to the air pressure of the reservoir, the effective area of said diaphragm exceeding that of the valve, a spring resisting the displacement of the diaphragm under the air pressure of the reservoir, means for varying the compression of said spring, a spring acting on said valve to counteract the action of the spring on the diaphragm, and means for varying the compression of said second spring, said second spring adapted to facilitate the displacement of the valve when the diaphragm is caused to move by the pressure in the resesvoir and whereby said valve is caused to sever the communication between the outlet of the first compressor unit with the reservoir and establish communication between said first compressor unit and the inlet of the second compressor unit.

7. In combination in a multistage compressor of the reciprocating type, a pair of independent, multistage-compressor units dispossed oppositely, the smallest cylinder of one of said multistage-compressor units being larger than the largest cylinder of the second multistage-compressor unit, a receiver associated with the outlet of each of said units, a reservoir, and a pressure-governed valve connecting the receiver of the first unit with the reservoir and with the inlet of the second unit, said valve including means for maintaining said receiver in communication with either the reservoir or the inlet of said second unit, said reservoir being also in communication with the receiver of the second unit.

8. In combination with a multistage compressor of the reciprocating type, including a driving pulley and a free pulley, a belt associated with the pulleys, a pneumatically-operable belt shifter engaging the belt, a valve casing interposed between the compressor and the belt shifter, a spring-actuated valve in said casing normally adapted to establish communication between said belt shifter and either the compressor or the atmosphere, a second spring-actuated valve for controlling the flow from the compressor to said first valve to cause the operation of said first valve after a predetermined air pressure has been obtained whereby said first valve cuts off the communication between the belt shifter and the atmosphere and establishes the communication between the compressor and the belt shifter, a diaphragm associated with the second valve adapted to be influenced by the air flowing from the compressor to the belt shifter, whereby said second valve is returned to its normal position, a spring-actuated valve normally establishing communication between the atmosphere and the diaphragm, said valve adapted to sever the communication when air pressure is applied to the diaphragm, and a valve for accelerating the exhaust from the belt shifter through the valve casing into the atmosphere, becoming operable when the first-mentioned spring-actuated valve returns to its normal position.

9. In combination with a multistage compressor of the reciprocating type, including a driving pulley and a free pulley, a pneumatically-operable belt shifter engaging the belt, a valve casing interposed between the belt shifter and the compressor, a spring-actuated valve normally establishing communication between the valve shifter and the valve casing, a second spring-actuated valve normally establishing communication between said valve casing and the atmosphere, a third spring-actuated valve in the casing normally preventing the flow from the compressor to the first-mentioned spring-actuated valve, a diaphragm in the valve casing associated with said last-mentioned valve and adapted to be influenced by the air pressure in the belt shifter, and a spring-actuated valve for accelerating the exhaust from the belt shifter into the atmosphere becoming operable after the first-mentioned spring-actuated valve has severed the communication between the belt shifter and the compressor.

10. In combination with a multistage compressor of the reciprocating type, including a driving pulley and a free pulley, a belt associated with the pulleys, a pneumatically-operable shifter associated with the belt, a valve casing interposed between the belt shifter and the compressor, said valve casing having a passage, a pair of spring-actuated valves controlling the communication of said passage with the compressor, said casing having a second passage, a spring-actuated valve normally establishing communication between said second passage and the atmosphere, a valve rigid with one of the pair of valves normally severing the communication between the first and second passages, a diaphragm associated with the other valve of the pair of valves and in communication with said second passage, said casing having a third passage, a spring-actuated valve normally establishing communication between the third passage and the atmosphere, a valve rigid with the last mentioned valve normally severing the communication of the first passage with the atmosphere, and a spring-actuated valve associated with the last-mentioned valves and operable after a predetermined displacement of said valves to bring the third passage into communication with the atmosphere, the valve rigid with one valve of the pair of valves normally establishing communication between the second and third passages, said second passage being always in communication with the belt shifter.

11. In combination with a multistage compressor of the reciprocating type, including a driving pulley and a free pulley, a belt associated with the pulleys, a pneumatically-operable belt shifter associated with the belt, a valve casing interposed between the belt shifter and the compressor, said casing having a passage, a pair of spring-actuated valves normally preventing the flow from the compressor to the passage, a diaphragm associated with one valve of the pair of valves and adapted to be influenced by the air pressure when said valve establishes communication between the compressor and the passage, said casing having a second passage, a valve rigid with the other valve of the pair of valves normally preventing the flow from the first passage into the second, said last-mentioned valve adapted to establish communication between the second and first passages after the other valve of the pair of valves has established communication between the first passage and the compressor, a spring-actuated valve normally establishing communication between the second passage and the atmosphere, a second diaphragm spaced from the first diaphragm to influence the same valve and disposed to be influenced by the air in the second passage, the space between the two diaphragms being under the influence of the atmosphere, said casing having a third passage normally in communication with the second passage through the medium of the valve which controls the communication between the second and the first passage, the communication between the second and third passages adapted to be interrupted when the communication between the second and the first is established, a spring-actuated valve normally closing the communication between the first passage and the atmosphere, a valve rigid with the last-mentioned valve normally establishing communication between the third passage and the atmosphere, and a spring-actuated valve normally establishing communication between the third passage and the atmosphere.

12. In combination with a multistage compressor of the reciprocating type, including a driving pulley and a free pulley, a belt associated with the pulleys, a pneumatically-operable belt shifter engaging a belt, a valve casing interposed between the compressor and the belt shifter, a valve in the casing controlling the flow of air from the compressor to the belt shifter, a second valve controlling the communication of the belt shifter with the atmosphere, and means subject to the air pressure of the belt shifter controlling the operation of said valves.

13. In combination, oppositely-disposed block castings each having a plurality of cylinders of decreasing capacities, a piston in each cylinder, a shaft having cranks at 180 degrees to each other, means connecting the alining pistons with the corresponding cranks, valve-controlled passages between the cylinders of the same block casting whereby each block casting constitutes a multistage-compressor unit, and means for working said units in parallel or in series.

14. In combination, oppositely-disposed block castings each having a plurality of cylinders of decreasing diameters, the smallest cylinder of one of the block castings being larger than the largest cylinder of the second block casting, a piston in each cylinder, a shaft having cranks at 180 degrees to each other engaging the pistons of the two block castings alining therewith, means for actuating the crank shaft, valve-controlled passages between the cylinders of the same block casting whereby each series of cylinders in the same block casting constitute a multistage-compressor unit, and a reservoir associated with the outlet of each unit.

15. In combination, a pair of independent multistage-compressor units of the reciprocating type, a crank casing connecting the two units, a shaft having cranks at 180 degrees mounted to revolve in said crank casing, a slotted crosshead engaged by each of said cranks, a guide within said crank casing, each of said crossheads being connected to the alining pumping elements of the two units and means for working the opposite units in parallel or in series.

16. In combination, a pair of multistage-compressor units of the reciprocating type, a crank casing connecting the two units and maintaining them opposite each other, a shaft having cranks at 180 degrees to each other rotatably mounted in said crank casing, a slotted crosshead in each crank, means for guiding each cross-head within the crank casing, each of said crossheads being connected with the alining pumping elements of the two units and means for working the two units in parallel or in series.

17. In combination, a pair of independent multistage compressor units of the reciprocating type, the smallest cylinder of one of said multistage-compressor units being larger than the largest cylinder of the second multistage-compressor unit, a crank casing connecting the two units in spaced, opposite relation, a shaft having cranks at 180 degrees mounted to rotate within the casing, a slotted crosshead for each of said cranks, means for guiding the crosshead, each of said crossheads being connected to the elements of the units alining therewith and whereby said units are actuated when the crossheads are actuated, a reservoir, and a pressure-governor valve interposed between the outlet of the first-mentioned compressor unit, the reservoir, and the inlet of the second compressor unit whereby said first compressor may be caused to discharge into such reservoir of said second unit, whereby the two independent multistage-compressor units are transformed into a single multistage-compressor unit.

NELSON J. PARKER.

Witnesses:
P. E. KUHL,
T. A. COX.